E. A. WHITE.
SHOCKER ATTACHMENT FOR GRAIN HARVESTERS AND BINDERS.
APPLICATION FILED MAR. 30, 1909.
944,160.
Patented Dec. 21, 1909.
4 SHEETS—SHEET 2.
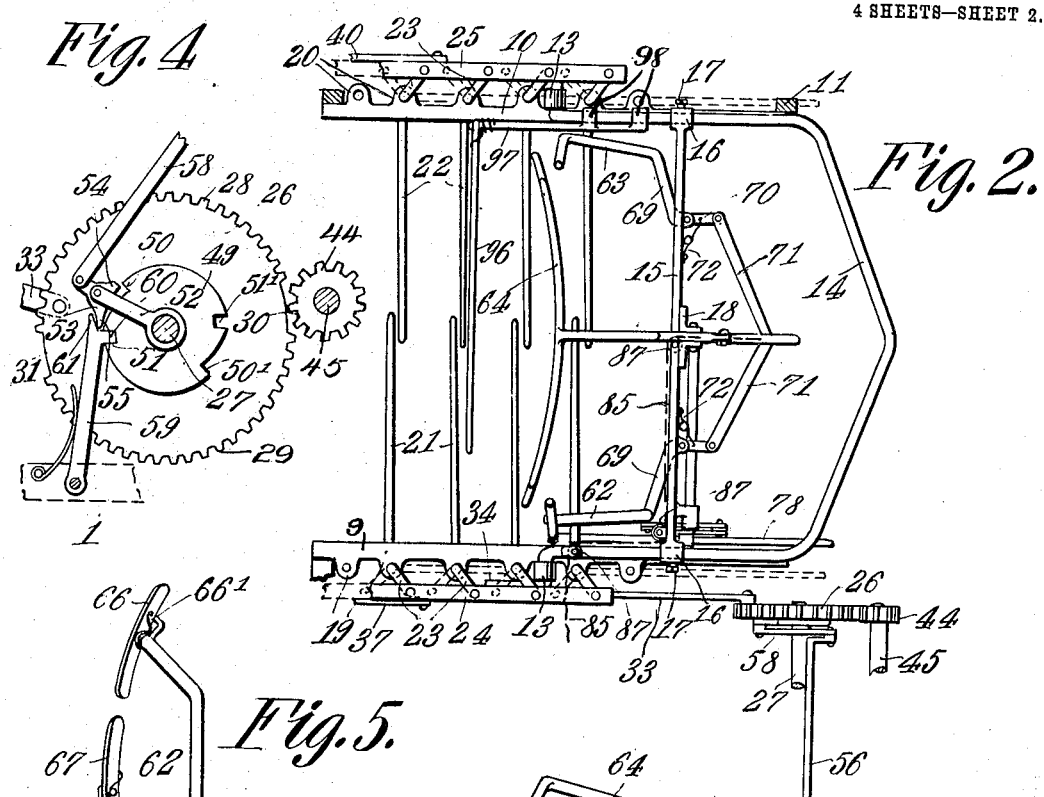
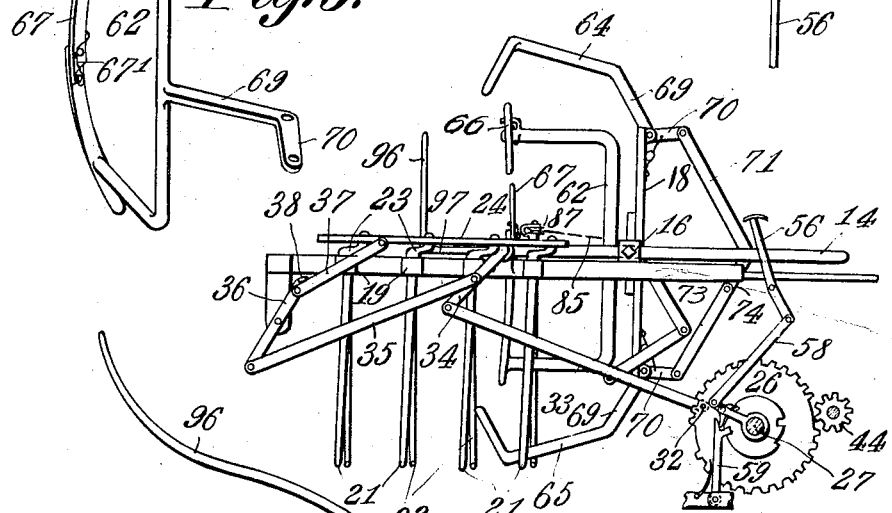
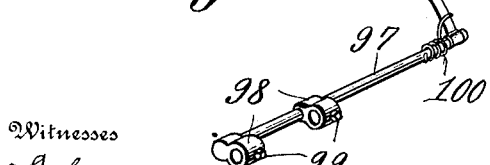
Witnesses
E. Larson
C. C. Hines
Inventor
Eugene A. White
By Victor J. Evans
Attorney

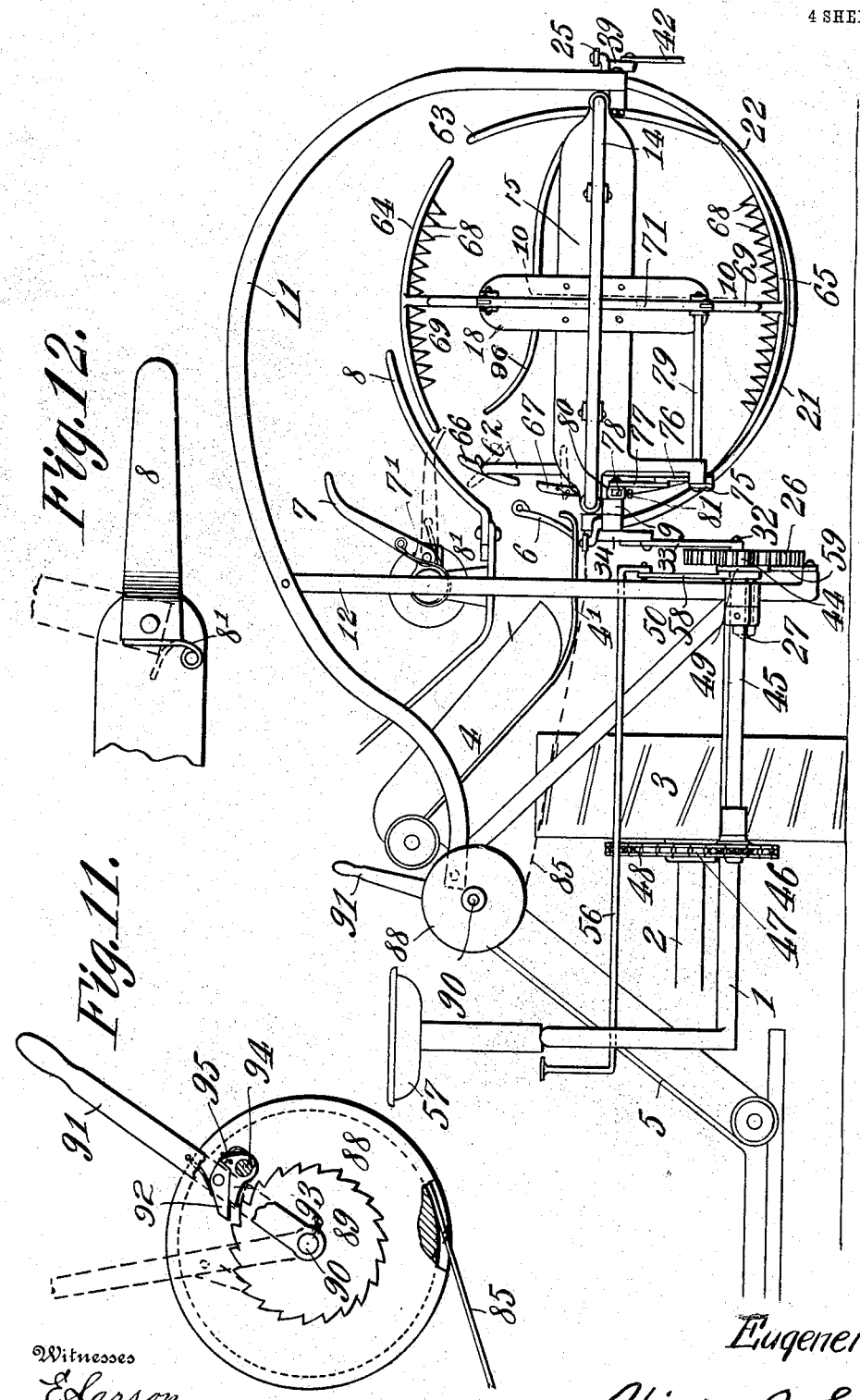

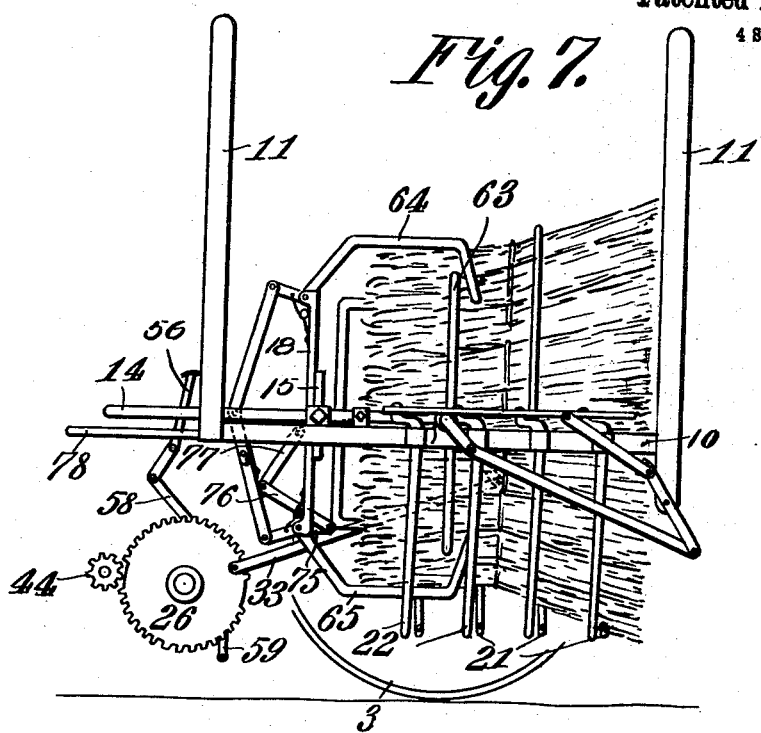
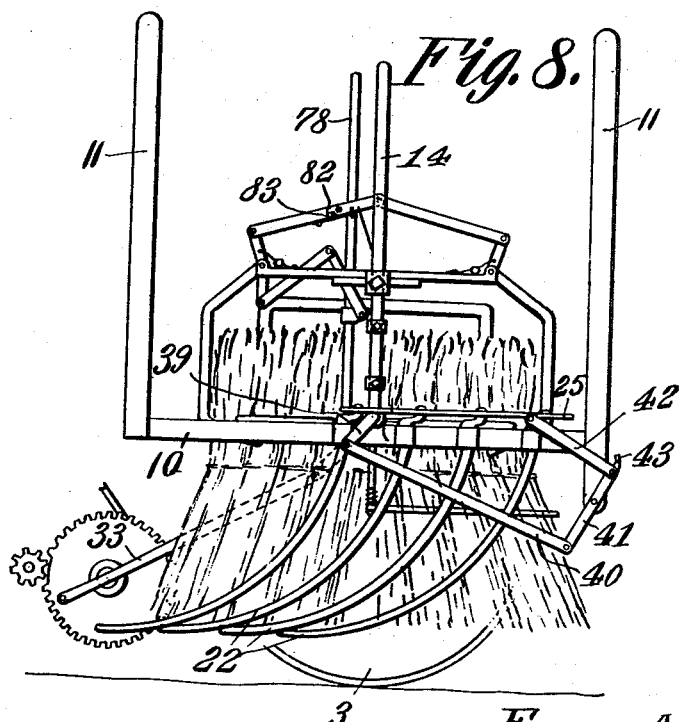

E. A. WHITE.
SHOCKER ATTACHMENT FOR GRAIN HARVESTERS AND BINDERS.
APPLICATION FILED MAR. 30, 1909.

944,160.

Patented Dec. 21, 1909.
4 SHEETS—SHEET 4.

Witnesses
E. Larson
C. C. Huner

Inventor
Eugene A. White

By Victor J. Evans
Attorney

UNITED STATES PATENT OFFICE.

EUGENE A. WHITE, OF OCONOMOWOC, WISCONSIN.

SHOCKER ATTACHMENT FOR GRAIN HARVESTERS AND BINDERS.

944,160.

Specification of Letters Patent. Patented Dec. 21, 1909.

Application filed March 30, 1909. Serial No. 486,676.

*To all whom it may concern:*

Be it known that I, EUGENE A. WHITE, a citizen of the United States, residing at Oconomowoc, in the county of Waukesha and State of Wisconsin, have invented new and useful Improvements in Shocker Attachments for Grain Harvesters and Binders, of which the following is a specification.

This invention relates to a shocker attachment for grain harvesters and binders, the object of the invention being to provide a simple, efficient and reliable shocker which is applicable to existing types of grain harvesters and binders, and is adapted to successively receive bundles of bound grain from the harvester and dump and stand a plurality of such bundles in the form of a shock in the field.

A further object of the invention is to provide a shocker which will operate without liability of injury to the bundles, and which will be under the thorough control of the operator.

With these and other objects in view, the invention consists of the features of construction, combination and arrangement of parts hereinafter fully described and claimed, reference being had to the accompanying drawings, in which:—

Figure 9:
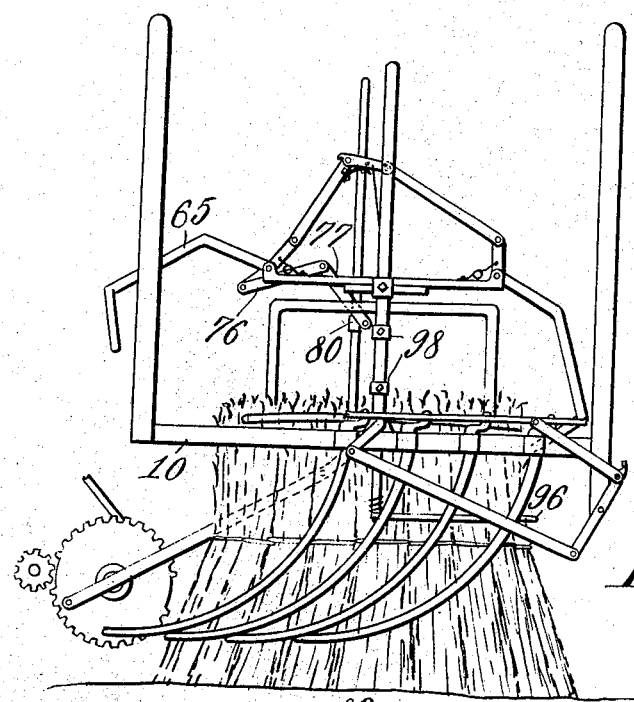
Figure 10:
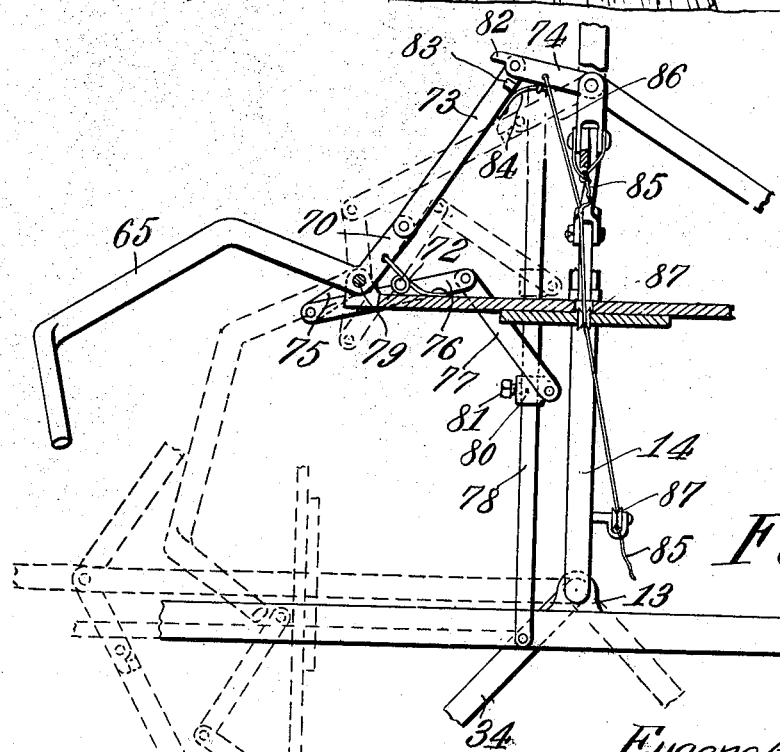

Figure 1 is a rear elevation of the shocker as applied to the delivery side of a harvester and binder, a portion of the latter being illustrated. Fig. 2 is a top plan view of the shocker with the parts thereof in normal or receiving position. Fig. 3 is a side elevation of the same. Fig. 4 is a detail view of the gearing for tilting the parts of the shocker from normal to dumping position and vice versa. Fig. 5 is a detail view of one of the gripping devices. Fig. 6 is a detail view of the bundle retaining arm. Figs. 7, 8 and 9 are views of the reverse side of the shocker from that shown in Fig. 3, showing, respectively, the shock formed and ready to be deposited, the cradle opened and the tilting frame turned to bring the shock into position for deposit, and the shock released and deposited. Fig. 10 is a section on an enlarged scale on line 10—10 of Fig. 1, showing features of construction of the gripping mechanism and the movement of the rear gripping device in full and dotted lines. Fig. 11 is a detail view of the mechanism for closing the gripping devices. Fig. 12 is a detail view of the guard arm.

Referring to the drawings, 1 designates portions of the main frame of a harvester and binder having a side delivery, 2 the main shaft or axle thereof, 3 the ground wheel mounted on the adjacent end of the axle, 4 the receiving chute or platform for the grain, upon which the latter rests while it is being bundled and tied, and 5 the delivery apron which conveys the grain to said platform, from which it is fed forward against a movable trip arm 6 by packing devices, not shown.

The trip arm or detent 6 moves outwardly to release the bundle under a predetermined pressure, to allow the same to discharge from the platform. In Fig. 1 I have shown above the outer end of the platform one of the rotary ejector arms 7 of the binding mechanism and the coacting bundle retaining device 8. These elements are shown as pivotally mounted for rearward and lateral movements respectively to adapt them to yield when the parts of the shocking mechanism come in contact therewith, so as to prevent injury thereto in the deposit of the shock and the return of the parts of the shocker to normal position. The arm 7 is yieldingly retained in normal position by a spring 7', while the arm 8 is yieldingly retained in normal position by a spring 8'. In accordance with my invention, the lower end of the platform 4 instead of being inclined is elevated to a horizontal position, as shown at 4' in Fig. 1, providing for the proper relative arrangement of the shocking device at a suitable elevation above the surface of the ground.

The shocker is arranged at the side of the frame beyond the wheel 3 and in line with the outer end of the platform 4, and comprises parallel side bars 9 and 10, the former being fixed to the main frame in any suitable manner and the latter connected with the main frame by arched braces 11 which are reinforced by uprights 12 secured to the main frame and arranged at the front and rear of the platform portion 4'. The bars 9 and 10 are provided with bearings 13 for the reception of laterally bent journals upon the forward free ends of a bail shaped tilting frame 14, between the side arms of which extends a cross bar or plate 15 having sleeves 16 at its ends slidably engaging the side arms of said tilting frame and adapted to be adjustably secured thereto by set screws 17. To the center of this cross bar or plate 15 is secured an upright 18. for a purpose hereinafter described, which upright is adjustable upon the tilting bail frame 14 through the medium of the adjustable connections of the plate 15. The side bars 9 and 10 are also formed with laterally extending bearings 19 and 20 for two oppositely arranged series of supporting fingers 21 and 22, which are arranged in staggered relation, and are adapted, when in operative position, to form a sectional grating or cradle below and between the bars 9 and 10 to receive and hold the bundles of grain which are to be formed into the shock, which bundles are supported and held against rearward displacement by the tilting bail 14, as clearly shown in Fig. 7. The fingers 21 and 22 are downwardly and inwardly curved and are movable from their normal transverse position shown in Fig. 3 outwardly and rearwardly to positions below and substantially in the vertical planes of the bars 9 and 10 to release the shock, as shown in Figs. 8 and 9. Each finger is journaled at its upper end in the associated bearing 19 or 20 and is provided with an outwardly extending crank arm 23, the crank arms of all the fingers 21 being connected by a horizontal link bar 24, while the crank arms of all the fingers 22 are similarly connected by a link bar 25. When these link bars are projected forwardly to the limit of their movement, the cranks will be disposed to hold the sets of fingers in normal supporting position, while upon the rearward movement of said link bars, as indicated in dotted lines in Fig. 2, and in full lines in Figs. 8 and 9, the fingers will be swung outwardly and rearwardly to release the shock.

The mechanism for operating the fingers comprises a mutilated gear wheel 26 loosely mounted upon a short shaft or axle 27 supported on the main frame and having its periphery formed with opposite segmental sets of teeth 28 and 29 separated by blank portions 30 and 31. This gear wheel carries at one side a crank or wrist pin 32, to which is connected one end of a pitman or connecting rod 33, which is connected at its opposite end with a crank arm 34 formed by the extension from the journal of the inner arm of the bail frame 14, and said crank arm 34 is in turn connected with the link bar 24 by a link 35, lever 36 and a link 37, one of which last named members is provided with a stop member 38 to engage the other, whereby the movement of said lever in projecting the link bar is limited. By this arrangement of connections provision is made for simultaneously swinging the fingers 21 outwardly and the bail frame upwardly to a vertical position when the gear 26 makes a one-half revolution from its normal position in its direction of rotation, and for reversing and returning the parts to normal position upon the second half revolution of the gear, the normal position of which is indicated in Figs. 3 and 4. The opposite set of fingers 22 is actuated by a crank arm 39 forming an extension from the journal of the outer side arm of the bail frame 14, which crank arm 39 is connected by a link 40 with a lever 41 and a link 42, said link 42 being connected with the link bar 25. As shown, the levers 36 and 41 are pivotally mounted upon depending portions of the frame bars 9 and 10, and the lever 41 is provided with a stop member 43 to engage the link 42 when said levers are fully straightened out, to serve, like the stop member 38 previously described, to limit the motion of the parts in projecting the supporting fingers. Hence when the gear 26 is actuated to either project or retract the fingers 21, the fingers 22 will be simultaneously projected and retracted through the swinging motion of the bail frame 14, which will be moved with the fingers 21 and communicate motion to the fingers 22. The gear 26 is adapted to be operated by a pinion 44 mounted on a shaft 45 journaled on the main frame of the machine and carrying a sprocket wheel 46 connected by a chain 47 with a sprocket gear 48 on the main shaft or axle 2, by which, when the harvester is in motion, the pinion will be continuously driven. The pinion is normally arranged opposite the blank space 30 of the gear 26, and hence does not impart motion thereto, so that the fingers and bail frame of the shocking device will remain stationary to receive and support the bundles of grain until a shock is formed and the gear 26 set into action. The means for adjusting the gear 26 to throw it into action comprises a clutch wheel or disk 49 fixed to the inner side of said gear and loosely mounted on the shaft 27, which disk is provided at one side with a recess forming a shoulder 50 and adjacent thereto with a notch 51, and at its diametrically opposite side with a similar shoulder 50' and notch 51'. Loosely mounted on the shaft adjacent the disk is an arm 52 carrying a pivoted dog or pawl 53 having an abutting shoulder 54 and a tapered toe or projection 55. This dog is adapted to seat within either of said recesses and its shoulder 54 is adapted to engage either shoulder 50 or 50' so that the disk and gear may be shifted. The shifting action is effected through the instrumentality of a lever 56 arranged to be operated by hand or foot by the driver from his seat 57 and connected with the pawl or dog by a link 58. A spring pressed locking pawl 59 is arranged adjacent the gear and provided with a lug 60 to engage the notches 51 and 51' and with an inclined shoulder 61. Normally the dog 53 seats within the recess forming the shoulder 50 in a tilted position out of contact with said shoulder but in contact with the shoulder 61 of the pawl 59, whose lug 60 engages the notch 51 and holds the disk and gear from rotation.

When the lever 56 is operated, the link 58 is drawn upon to tilt the dog and throw its shoulder 54 into engagement with the shoulder 50 and simultaneously cause its toe 55 to exert pressure on the shoulder 61 of the pawl 59 and force the latter out of locking position, whereupon the continued movement of the link 58 will cause the dog to turn the disk 49 and consequently the gear 26 so as to bring the teeth 28 into mesh with the pinion 44, whereupon the gear 26 will be given a half revolution to swing the supporting fingers and bail frame as described, at the limit of movement of which the crank pin 32 will be in position to start its return movement, while the blank space 31 of the gear will be situated opposite the pinion 44, thus arresting the motion of the gear, which will be locked in position by engagement of the pawl 59 with the notch 51', in which position of the parts it will be understood that the dog 53 will be arranged for coöperation with the shoulder 50'. After the shock is deposited, the operator by again shifting the lever 56 may shift the gear 26 in an obvious manner to bring the teeth 29 into engagement with the pinion 44, whereupon the gear 26 will be turned the remaining half of a complete revolution and will consequently restore the supporting fingers and bail frame to normal position, at which time the gearing will again assume the normal position shown in Fig. 4.

The bundles of grain supplied to the shocker to be formed into a shock are designed to be held between a series of grippers, comprising an inner gripping device 62, an outer gripping device 63 and upper and lower gripping devices 64 and 65, which are arranged to engage the sides and top and bottom of the bundles and hold the same while they are being manually bound into a shock and to hold the shock while it is being turned from a horizontal to a vertical position and when the fingers are released to deposit the same upon the ground. The inner gripping device 62 is shown in detail in Fig. 5 and comprises a U-shaped frame arranged in the line of feed of the bundles in their passage from the platform portion 4' into the cradle. The upper and lower arms of this gripping device are provided with pivoted guard fingers 66 and 67 which normally close the space between said arms to prevent backward movement of the bundles toward the platform. These fingers are pivotally mounted for outward movement to a limited extent to permit the bundles to pass from the platform to the cradle and are respectively held in and returned to normal position by springs 66' and 67'. The outer gripping device and upper and lower gripping devices are properly curved to embrace the shock and are generally similar in construction except that said upper and lower gripping devices are preferably provided with teeth 68 to firmly engage and hold the shock in position against shifting when turned to a vertical position.

The gripping devices are pivotally mounted for inward and outward swinging movement toward and from a common center, and each is provided with an arm 69 having a terminal crank 70. The respective arms 69 of the several gripping devices are pivotally connected with the cross bar or plate 15 and upright 18, and the crank 70 of the gripping devices 62, 63 and 64 are connected with each other by links 71, to adapt them to be operated in unison, and said gripping devices are adapted to be returned to normal or retracted position and maintained in such position by springs 72 connecting their cranks with the bar or plate 15. This is the mode of connecting the side and top gripping devices, which have the same radius of movement. The lower or rear gripping device 65, however, must have a greater range or radius of swinging movement in order to clear the top of the deposited shock in the forward movement of the harvester, to which end the crank 70 of said rear gripping device 65 is connected by a pair of links 73 and 74 with the links of the other gripping devices, and is provided with an auxiliary crank 75 which is connected by another pair of links 76 and 77 with a bar or rod 78 pivotally connected with the side bar 9, the arm 75 being mounted upon a rod 79 mounted to turn with the crank 70 and the link 77 being adjustably connected with the bar 78 by a sliding sleeve 80 adapted to be secured in adjusted position by a set screw 81. The link 74 is provided with a stop 82 to engage a lug 83 on the link 73 to limit the pivotal movement of said links, and the latter are connected by a spring 84 which normally maintains them broken at the joint to allow the gripping device 65 to freely open. This system of links permits said gripping device 65 to have a greater range of motion than the other gripping devices, which range of motion is adjustably limited by the links 76 and 77, so that such gripping device may swing open to an increased degree to project above the top of the shock and pass over said shock without liability of injuring or overturning the same. The links of the gripping devices 62, 63 and 64 are connected with a rope or cable 85 which has a branch 86 connected with the link 74 of the gripping device 65, the arrangement being such that when this cable is drawn upon the gripping devices will be closed to a greater or less degree to engage and compress the bundles and to hold the formed shock securely until it is deposited upon the ground. The cable extends over suitable guide pulleys 87 to a drum 88 mounted adjacent the driver's seat 57 and upon which said cable is wound. The drum is provided with a ratchet wheel 89 and is loosely mounted therewith on a shaft 90. A lever 91 is pivotally mounted on the shaft and provided with a pawl 92 to engage the teeth of the ratchet wheel, so that the drum may be intermittently turned forward to wind the cable 85 thereon to a greater or less extent and thus project the gripping devices to a greater or less degree according to the amount of grain contained in the bundles of the shock. The drum is adapted to be held against rearward movement by a spring actuated dog 93 pivotally mounted on a supporting rod 94 and having a shoulder 95 adapted to be engaged by the heel of the pawl 92 to limit the backward movement of said pawl and permit the lever 91 to be moved backward only a sufficient distance for a feed-up motion.

As hereinbefore described, the bundle ejector arms 7 and retaining device or arm 8 are respectively yieldingly mounted for rearward and lateral movements. The inner gripper 62 lies in the plane of rotation of said ejector arms and the latter are yieldingly mounted to allow them to swing back and slide past said gripper on coming in contact therewith following the discharge of the bundle. The spring 7' of each arm 7 is, however, strong enough to prevent yielding movement of the arm from the resistance of the bundle in the ejecting action. The retaining arm 8, whose function is to guide the bundle on its discharge through the gripper 62 and prevent the bundle from being thrown above the plane of said gripper by the arms 7, lies in the path of tilting movement of the frame 14 and consequently would prevent said frame from being tilted to a vertical position were it (said arm 8) rigidly mounted. When the frame is tilted and nears a vertical position it contacts with arm 8 and the latter yields laterally under the pressure of said frame, allowing the frame to come to a perpendicular position.
When the frame is tilted back to normal position, the spring 8' restores the arm 8 to its normal position in an obvious manner.

From the foregoing description taken in connection with the drawings, the construction of the machine will be apparent, and it will be understood that upon the deposit of a sufficient number of bundles in the cradle to form a shock the gripping devices are projected to engage and hold the same, the controlling mechanism then actuated to retract the supporting fingers and tilt the bail to a vertical position, by which the shock will be correspondingly turned, and the gripping devices then released to deposit the shock on the ground. As soon as the shock is deposited and the shocking device has passed the same, the controlling gearing is operated to return the fingers and bail frame to normal position for the formation of another shock and the drum is released to also permit the gripping fingers to be opened by their retracting springs. Owing to the construction and mode of operating these parts, it will be obvious that a shock may be quickly and conveniently formed and deposited, and that a simple type of mechanism is provided for this purpose. The shocker is adapted to be applied to the delivery side of any ordinary type of harvester and binder, and its convenience and advantages in this connection will be appreciated.

If desired, a device may be provided to keep the bundles from shaking out when the shocker is nearly full. This is shown in detail in Fig. 6 and comprises a guard finger or arm 96 curved to overlie the bundles and pivoted at one end upon a rod 97 having sleeves 98 to engage the outer side arm of the bail frame 14 and provided with set screws 99 to secure it in position. A spring 100 yieldingly connects said arm with the rod to permit the arm to have upward movement as the bundles are inserted, the light pressure of the spring being sufficient only to retain the upper bundles in place. When the shock is turned to a vertical position prior to deposit the guard arm bears against the lower front portion thereof and prevents the shock from tilting over at the time of deposit.

Having thus fully described the invention, what is claimed as new, is:—

1. A shocker embodying a supporting frame, a cradle carried by the frame and comprising outwardly swinging sections, a shock turning device mounted on the frame and provided with a plurality of grippers movable toward and from a common center, means for simultaneously opening and closing the sections of the cradle and moving said turning device to dump the shock, and back to normal position, and means for controlling said grippers.

2. A shocker embodying a supporting frame, a cradle carried by the frame and comprising sets of swinging arms, a tilting frame mounted on the supporting frame for movement from a horizontal to a vertical position, means for operating one of the sets of arms and the tilting frame, means for operating the other set of arms from the tilting frame, grippers carried by the tilting frame, and means for controlling said grippers.

3. A shocker embodying a supporting frame, a cradle composed of outwardly and rearwardly swinging sets of oppositely disposed arms carried by the frame, said arms being provided with cranks, a tilting frame mounted on the supporting frame for movement from a horizontal to a vertical position and also provided with cranks, connections between the respective cranks of the tilting frame and the cranks of the opposite sets of arms, means for imparting motion to one of said connections to swing the arms and tilting frame in unison, grippers carried by the tilting frame, and means for controlling said grippers.

4. A shocker embodying a supporting frame, a cradle formed of swinging sets of arms mounted on the supporting frame, a tilting frame carried by the supporting frame for movement from a horizontal to a vertical position, means for simultaneously swinging the arms and tilting frame, a support adjustably mounted on the tilting frame, grippers carried by said support, and means for controlling said grippers.

5. A shocker embodying a supporting frame, a cradle formed of swinging sets of arms carried by said frame, a tilting frame mounted on the supporting frame for movement from a horizontal to a vertical position, grippers carried by the tilting frame, means for controlling the grippers, and mechanism for simultaneously operating the cradle arms and tilting frame, said mechanism including a mutilated crank gear having oppositely arranged sets of teeth, a drive gear coöperating therewith, means for holding the gear in its normally inoperative positions, and means for shifting the gear to bring one or the other of its toothed portions into engagement with the driving gear.

6. A shocker embodying a supporting frame, a cradle formed of swinging sets of arms carried by the frame and provided with cranks, a tilting frame mounted on the supporting frame for movement from a horizontal to a vertical position and also provided with cranks, grippers carried by said tilting frame connections between the cranks of the tilting frame and the cranks of the respective sets of arms, an intermittent drive gearing for shifting the arms and tilting frame alternately in reverse directions, means for controlling the grippers, and a connection between said gearing and one of the aforesaid connections.

7. A shocker embodying a supporting frame, a cradle carried thereby and comprising outwardly movable sets of arms, a tilting frame carried by said supporting frame for movement from a horizontal to a vertical position, connections between the arms and tilting frame to effect their movements in unison, grippers carried by the tilting frame, means for controlling the same, intermittent drive gearing for alternately moving the arms and tilting frame in reverse directions, and means for controlling said gearing.

8. A shocker embodying a supporting frame, a cradle carried thereby and comprising outwardly movable sets of arms, a tilting frame carried by said supporting frame for movement from a horizontal to a vertical position, connections between the arms and tilting frame to effect their movements in unison, intermittent drive gearing for alternately moving the arms and tilting frame in reverse directions, means for controlling said gearing, grippers movably mounted on the tilting frame, and means for controlling said grippers.

9. A shocker embodying a supporting frame, a cradle carried by the frame and embodying opposite sets of outwardly swinging arms, a tilting frame carried by the supporting frame for movement from a horizontal to a vertical position, means for simultaneously swinging the arms and tilting the frame, gripping mechanism carried by the tilting frame, means for controlling the same, and a resilient guard arm mounted on the tilting frame to overlie the bundles in the operation of forming a shock.

10. A shocker embodying a supporting frame, a cradle carried thereby and comprising outwardly movable sets of arms, a tilting frame mounted on the supporting frame for movement from a horizontal to a vertical position, means for swinging the arms and frame in unison, a support adjustably mounted on the tilting frame, grippers carried by said support, means for controlling the grippers, and a yielding guard arm carried by the supporting frame to overlie the bundles in the cradle in the operation of forming the shock.

11. A shocker embodying a supporting frame, a cradle carried thereby and comprising outwardly movable sets of arms, a tilting frame carried by said supporting frame for movement from a horizontal to a vertical position, means for simultaneously operating the arms and tilting frame, grippers mounted on the tilting frame for simultaneous movement toward a common center to engage the shock on all sides, and means for controlling said grippers.

12. A shocker embodying a supporting frame, a cradle carried thereby and comprising outwardly movable sets of arms, a tilting frame carried by said supporting frame for movement from a horizontal to a vertical position, means for simultaneously operating the arms and tilting frame, grippers mounted on the tilting frame for simultaneous movement toward a common center to engage the shock on all sides, one of said grippers having spaced portions provided with resilient detents, and means for controlling said grippers.

13. A shocker embodying a supporting frame, a cradle carried thereby and comprising outwardly movable sets of arms, a tilting frame carried by said supporting frame for movement from a horizontal to a vertical position, means for simultaneously operating the arms and tilting frame, grippers mounted on the tilting frame for simultaneous movement toward a common center to engage the shock on all sides, toggle links connected with the grippers, and means for swinging said links in reverse directions to project and retract the grippers.

In testimony whereof I affix my signature in presence of two witnesses.

EUGENE A. WHITE.

Witnesses:
M. V. STICKLING,
RAYMOND D. PENNEY.